United States Patent [19]

Dutton

[11] 3,949,239

[45] Apr. 6, 1976

[54] CIRCUIT FOR ACTUATING A MONOSTABLE OR BISTABLE INDUCTIVE DEVICE

[75] Inventor: Henry W. T. Dutton, Danbury, Conn.

[73] Assignee: International Telephone and Telegraph Corporation, Nutley, N.J.

[22] Filed: June 24, 1974

[21] Appl. No.: 482,042

[52] U.S. Cl. .................................. 307/98; 318/229
[51] Int. Cl.² ................... H01H 47/02; H01H 51/34
[58] Field of Search ............... 317/124, 13 C, 13 R; 307/98, 93; 318/229

[56] References Cited
UNITED STATES PATENTS 3,080,491   3/1963   Howell ................................ 317/124

Primary Examiner—David Smith, Jr.
Attorney, Agent, or Firm—John T. O'Halloran; Menotti J. Lombardi, Jr.; Vincent Ingrassia

[57]   ABSTRACT

This relates to an ac circuit for actuating a monostable or bistable inductive device in response to the opening of a normally closed switch. A capacitor is provided in series with the parallel combination of an inductive switching element and a normally-closed switch. When the normally closed switch opens, there results a series circuit consisting of the inductive switching element and the capacitor which, when properly chosen, will have a capacitive reactance which substantially cancels the inductive reactance of the switching element, thereby substantially reducing the overall circuit impedance. This clearly reduces heat dissipation and insures sufficient voltage across the inductive element to cause actuation.

3 Claims, 6 Drawing Figures

3,949,239

CIRCUIT FOR ACTUATING A MONOSTABLE OR BISTABLE INDUCTIVE DEVICE

BACKGROUND OF THE INVENTION

This invention relates to a circuit for actuating a monostable or bistable inductive device, and more particularly to the actuation of said device upon the opening of a normally-closed switch.

It is sometimes necessary in ac circuits to actuate a monostable or bistable inductive device in response to the opening of a normally-closed switch. This may be accomplished simply and reliably without great expense and without the need of an additional relay by placing the normally-closed switch in parallel with the inductive device and placing this parallel combination in series with a resistor across an appropriate source of ac voltage. However, this solution offers certain disadvantages. For example, when the normally-closed switch opens, the total impedance of the circuit increases. Therefore, the inductive device must have a high sensitivity in order to insure that there will be enough of the source voltage across the inductive element to safely actuate it. Of course, a source voltage having a value several times greater than the rating of the inductive device could be employed. However, this would result in wasted heat dissipated by the series resistor. Further, heat dissipation in the series current limiting resistor in the preactuating mode is certainly undesirable in certain applications; for example, control circuits for submersible pumps used in mines where any heat build-up increases the probability of explosion in areas where combustible gases accumulate.

SUMMARY OF THE INVENTION

It is an object of the present invention to provide a circuit for actuating a monostable or bistable inductive device in response to the opening of a normally-closed switch wherein there will always be insured sufficient voltage across the inductive element to safely actuate it and, at the same time, minimize circuit impedance to avoid excessive heat dissipation.

According to a broad aspect of the invention, there is provided a circuit for actuating an inductive device in response to the opening of a normally-closed switch comprising: at least one normally-closed switch; an inductive switching device coupled in parallel with said normally-closed switch; a capacitor coupled in series with the parallel combination of said switch and said inductive switching device; and a source of ac voltage coupled across the series circuit comprising said capacitor and said parallel combination.

The above and other objects of the present invention will be more clearly understood from the following detailed description taken in conjunction with the accompanying drawings, in which:

BRIEF DESCRIPTION OF THE DRAWINGS

FIG. 1b is an impedance chart of the circuit according to FIG. 1a.

FIG. 2b is an impedance diagram corresponding to the circuit of FIG. 2a;

DESCRIPTION OF THE PREFERRED EMBODIMENTS

Figure 1B:
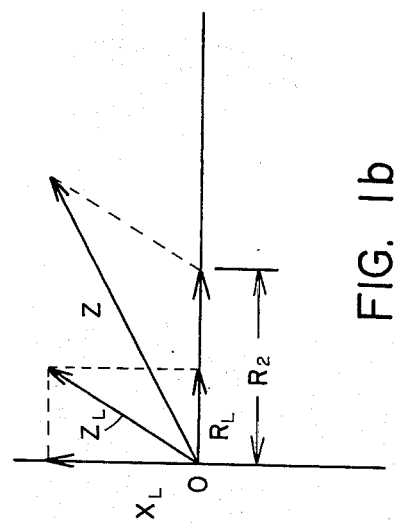
Figure 1A:
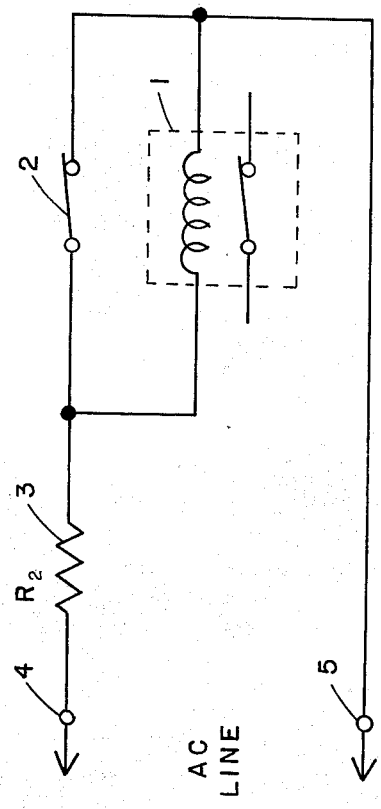
FIG. 1a is a schematic diagram of a circuit for actuating an inductive device in response to the opening of a normally-closed switch, which circuit employs a current limiting resistor in series with the parallel combination of the inductive device and the actuating normally-closed switch.

Referring to FIG. 1a, there is shown the parallel combination of a monostable or bistable inductive device 1 and a normally-closed switch 2. In series with this parallel combination is current limiting resistor 3. The entire circuit is coupled to an ac line at its terminals 4 and 5.

To illustrate the disadvantages of using a circuit employing a series current limiting resistor 3, reference is made to FIG. 1b which is an impedance chart of the circuit in FIG. 1a illustrating the component impedance of each circuit element in FIG. 1a and the resulting total circuit impedance. The impedance of inductive device 1 has two components $R_L$ and $X_L$ which are 90° out of phase. $R_L$ represents the resistance of inductive device 1 and $X_L$ represents the inductive reactance of the inductive device. In phase and cumulative to $R_L$, is the resistance of current limiting resistor 3 when the normally-closed switch 2 is opened. Adding the resistance of resistor 3 to the resistive component of the impedance of inductive device 1 and combining the result with the inductive reactance of inductive device 1 yields a total circuit impedance corresponding to Z shown in FIG. 1b when switch 2 is opened.

It is this high circuit impedance that causes the disadvantages described above.

Figure 2B:
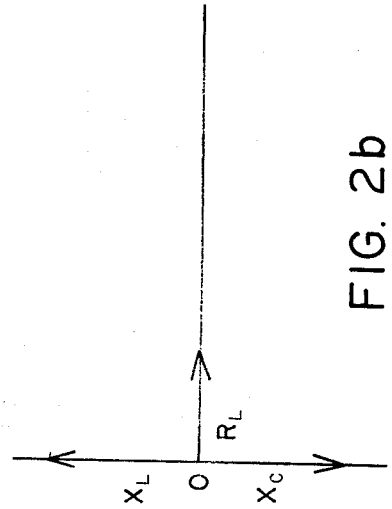
Figure 2A:
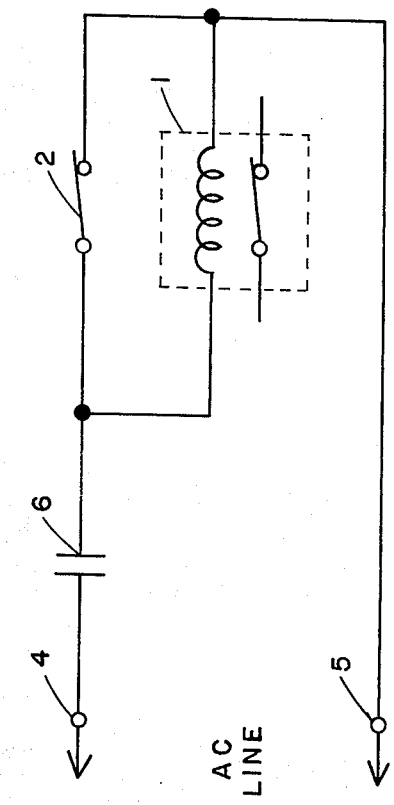
FIG. 2a is a schematic diagram of a circuit according to the invention.

In order to provide a simple and inexpensive solution to the problems encountered when using a series resistor, FIG. 2a illustrates a similar circuit wherein series resistor 3 has been replaced by capacitor 6. Now, the total circuit impedance does not increase when switch 2 is opened but, in fact, decreases as long as the value of capacitor 6 is properly chosen. Referring to FIG. 2b, the impedance components of inductive device 1 remain the same. However, capacitor 6 has an impedance which is a purely capacitive reactance ($X_C$) which is 180° out of phase with the inductive component ($X_L$) of the impedance of device 1. These two components, $X_C$ and $X_L$, cancel each other, leaving only the resistive component $R_L$ of inductive element 1. This results in a circuit impedance which is substantially lower than the circuit impedance of FIG. 1. As a result, it is actually possible to use a voltage lower than the rated value to actuate the inductive device.

The reduction in circuit impedance insures that there will be enough of the source voltage across inductive element 1 to safely actuate it. Further, there need be no concern with respect to heat generation. A well-chosen capacitor (ceramic, paper/foil, film/foil, etc.) has virtually no resistance and will therefore generate no heat regardless of current flow. It is not necessary, and sometimes not even desirable, that the reactances $X_L$ and $X_C$ cancel each other exactly, and therefore a wide range of peripheral circumstances may be accomodated; capacitor size and cost, voltage limitations, component availability, etc.

Figure 3:
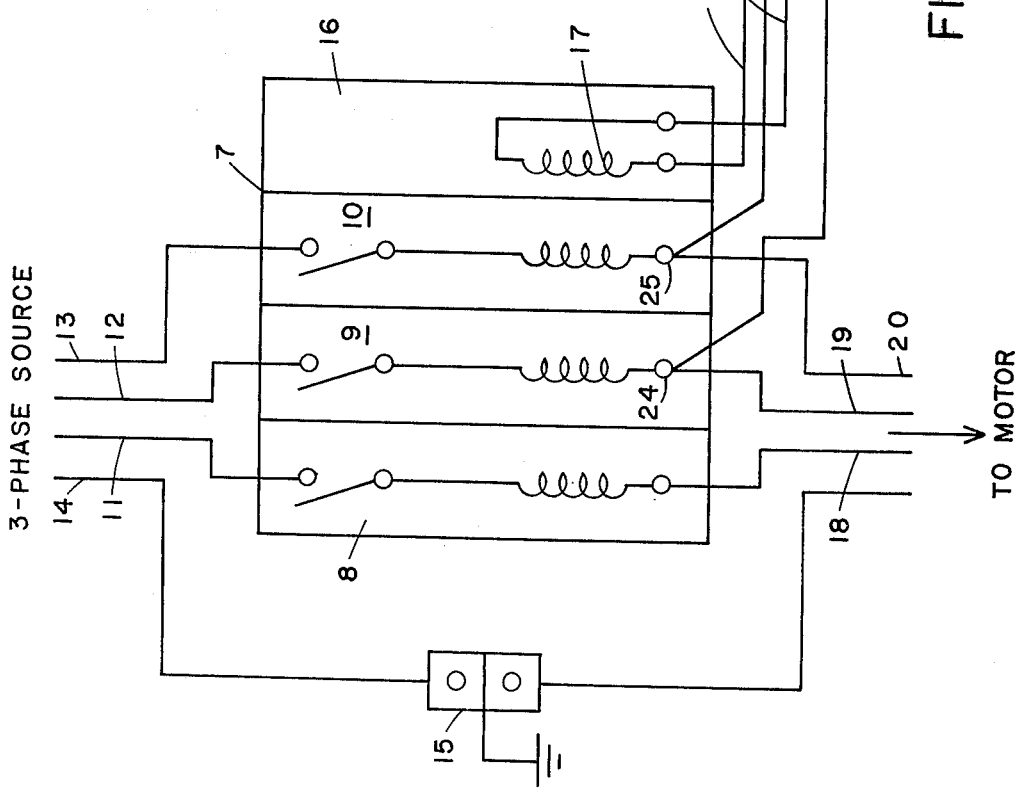
FIG. 3 is a block diagram illustrating the use of the invention in a submersible pump motor control circuit.

FIG. 3 shows a typical application of the approach described above with respect to the circuit of FIG. 2a for controlling the administration of power to the motor of a submersible pump. Unit 7 represents a hydraulic-magnetic manual motor control of the type, for instance, manufactured by Heinemann Electric Company. This device is similar both in function and operation to a conventional circuit breaker with the exception that the thermal time delay element of a conventional thermal magnetic breaker is replaced by a hermetically sealed, spring-loaded hydraulic dashpot delay element.

The Heinemann hydraulic-magnetic circuit breaker operates on load-current-produced magnetic-flux variations in a solenoid coil. The coil is wound around a hermetically sealed, non-magnetic tube containing a spring-loaded, movable iron core and a silicone liquid fill. With the load current either at or below the breaker's nominal rating, the magnetic flux is of insufficient strength to move the core substantially, and it remains near the end of the tube opposite the armature.

On an overload the magnetic flux force increases, pulling the iron core into the coil towards the armature end of the tube. This reduces the reluctance of the magnetic circuit and further increases the strength of the magnetic field. The silicone liquid regulates the core's speed of travel, creating a controlled time delay that is inversely proportional to the magnitude of overload. (In non-time-delay breakers, this intentional delay function is omitted).

When the magnetic flux reaches a predetermined value, the armature is attracted to the pole piece and the breaker trips. (The breaker may trip before the core reaches the pole piece if the critical flux value is reached first.) On very heavy overloads or short circuits, the flux produced by the coil alone, irrespective of core position, is sufficient to pull in the armature. The time delay is by-passed, and circuit interruption is instantaneous, a highly desirable response characteristic.

After the breaker has tripped, the movable iron core returns quickly under spring pressure to its original position. Where rapid reset of the breaker is required, a tiny, ball-type check valve can be provided in the center of the iron core. As the core returns, the valve opens, allowing the silicone fluid to pass through. As a result, the core can move more freely, quickly restoring the full time-delay characteristic of the breaker.

For added protection, the time delay is self-adjusting to ambient temperature conditions. At high ambients, where the overload tolerance of most circuits is lessened, the viscosity of the silicone fluid in the breaker's dashpot is lessened and the time-delay response is thereby shortened. At low temperatures, the response is correspondingly longer to allow for cold equipment startups.

The Heinemann E-Frame breakers can consist of from two to six poles and incorporate common-trip construction. The contact arms of each pole are internally connected by a tripper bar which operates all poles simultaneously. Thus, an overload condition on any pole causes all poles to trip. For three-phase motor control, a four-pole E-Frame Breaker can be employed and is shown functionallly as breaker element 7 in FIG. 3.

Referring again to FIG. 3, each switching element 8, 9 and 10 for controlling the administration of power to the pump motor is in series with its own hydraulic-magnetic trip element which, in turn, carries the full motor current. Each phase leg of the motor supplied by lines 11, 12 and 13 from a 3-phase power source is, as stated previously, protected by a separate element, and each is bolted together as a unit with a common terminal "trip" bar. If one unit trips, they all trip, thereby shutting down the motor. Line 15 is a ground line which, via ground lug 15, is coupled to the motor.

To this combination (three inductive elements for a three-phase motor), a fourth pole 16 is added. Coil 17 is wound, not for full-load current but instead, for some high voltage (low current) as might be available in the control enclosure. The common trip element referred to above is also coupled to this fourth pole 16. This option is commercially available from several manufacturers and is often used for remote tripping as a result of the closing of normally opened switches.

Again there appears the problem of insuring that the pump motor is shut down as a result of the opening of a normally closed switch. Available in most submersible pump motors, in excess of 18 h.p., is a series string of normally closed pilot thermal switches. These are buried in the motor stator hot spots and have limited current carrying capacity. Thermal switches are required to be normally closed in order to accommodate the coil circuits of the most common commercially available magnetic motor-starters, but hydraulic-magnetic manual motor starters are increasingly used primarily due to their simplicity, compactness, reliability, low cost, and are relatively tamper-proof however, they require use of the inventive circuit described herein in order to adapt to the normally-closed thermal switch(es) in the motor. In the event of overheating, one or more of the thermal switches will open. Using the circuit described with respect to FIGS. 2a and 2b, the opening of any of the thermal switches can be used to effect motor shutdown by interrupting power flow from lines 11, 12 and 13 to lines 18, 19 and 20 respectively.

Since the thermal switches are series connected, they are pictorially represented by single switch 21 located within the motor stator 22 in FIG. 3. Capacitor 23 in FIG. 3 corresponds to capacitor 6 in FIG. 2a, terminals 24 and 25 in FIG. 3 corresponds to terminals 4 and 5 respectively in FIG. 2a, and the fourth pole 16 in FIG. 3 corresponds to inductive element in FIG. 2a.

The fourth pole, coil 17, is highly inductive. Through terminal connector 24, the normally closed thermal switch 21 in the motor stator 22 is coupled in parallel with coil 17 via lines 25, 26, 27, 28 and terminals A and B. Capacitor 23 is then placed in series with this parallel combination via terminals B and C. The arrangement is then connected to the motor power supply on the load side of the motor starter via terminals 24 and 25, lines 29 and 30 and terminals A and C. This arrangement also affords circuit protection without requiring additional components.

As stated earlier, when thermal switch 21 is closed, coil 17 is shunted, and the only element restricting current flow is capacitor 23. Should switch 21 open, a series circuit consisting of capacitor 23 and coil 17 would result.

The resulting impedance is so low that the coil 17 will trip its release mechanism, opening all motor starter power switches in poles 8, 9 and 10 and deactivating both pump motor and pump motor control system. When the motor cools and the thermal switches again close, the pump motor may be manually restarted. Until then, any attempt to restart would be frustrated by the automatic reactivation of the internal trip mechanism.

Figure 4:
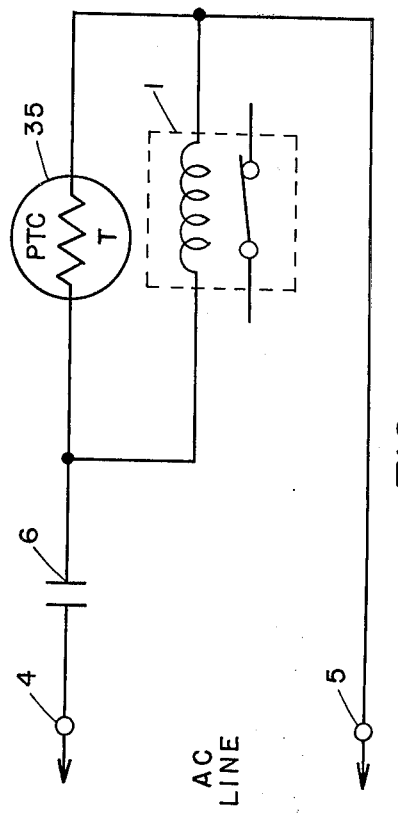
FIG. 4 shows a further embodiment of the invention.

The inventive circuit is applicable to any inductively driven circuit wherein the switching element is unavoidably normally closed; for example, control panel power-down interlocks. Further, it should be clear that other devices, for instance, a positive-temperature coefficient (PTC) thermistor has substantially the same function as a normally closed thermal switch. A PTC thermistor has low resistance, at ordinary temperatures, and the resistance rises linearly but gradually with increased temperature. At some predetermined temperature, however, the resistance begins to rise sharply with increased temperature and in effect, acts as a switch. Referring to FIG. 4, a PTC thermistor 35 may be used as the normally closed switch 2 in FIG. 2a.

What is claimed is:

1. A circuit for controlling the administration of power to an AC motor wherein there is provided in the stator of said motor at least one normally-closed thermal switch having first and second terminals comprising:
   a source of AC power;
   a first inductively controlled means coupled between said source and said motor for interrupting power to said motor;
   second inductive means for controlling said first inductively controlled means and coupled across said first and second terminals of said at least one normally-closed thermal switch resulting in a parallel combination;
   a capacitor coupled between said parallel combination and said first inductively controlled means.

2. A circuit according to claim 1 wherein the reactance of said capacitor is substantially equal to the reactance of said second inductive means, resulting in a series circuit consisting of said second inductive means and said capacitor when said at least one normally-closed switch opens, thereby substantially reducing total circuit impedance.

3. A circuit according to claim 2 wherein said first inductive means is a multi-pole inductive switching device, and wherein the terminals of said series circuit are each coupled to one of said multi-poles.

* * * * *